(12) United States Patent
Moore et al.

(10) Patent No.: US 6,529,216 B1
(45) Date of Patent: Mar. 4, 2003

(54) METHOD AND COMPONENT FOR DISCONTIGUOUS RANGE SELECTION

(75) Inventors: Simon Edward Moore, Burbage (GB); Andrew John Smith, Wellesbourne (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,820

(22) Filed: Feb. 24, 2000

(30) Foreign Application Priority Data

Dec. 21, 1999 (GB) ............................................. 9930165

(51) Int. Cl.[7] ................................................. G09G 5/00
(52) U.S. Cl. ...................... 345/764; 345/771; 345/833; 345/848
(58) Field of Search ................................. 345/723, 764, 345/766, 771, 833, 848, 440, 440.2, 441; 707/500, 539

(56) References Cited

U.S. PATENT DOCUMENTS

| | | | | |
|---|---|---|---|---|
| 5,437,005 A | | 7/1995 | Torres | ........................ 395/145 |
| 5,710,899 A | * | 1/1998 | Eick | ........................... 345/708 |
| 5,926,807 A | * | 7/1999 | Peltonen et al. | ................ 707/3 |
| 6,323,852 B1 | * | 11/2001 | Blower et al. | ............... 345/804 |
| 6,366,280 B1 | * | 4/2002 | Allen et al. | .................. 345/419 |
| 6,366,299 B1 | * | 4/2002 | Lanning et al. | ............. 345/586 |
| 6,400,366 B1 | * | 6/2002 | Davies et al. | ............... 345/440 |

OTHER PUBLICATIONS

Class JList, http://java.sun.com/products/jfc/swingdoc-3 api-1.1/javax/swing/JList.html 12/99, 23 ps.
Class JComponent, http://java.sun.com/products/jfc/s . . . pi1.1/javax/swing/JComponent.html 12/99, 32 pages.

* cited by examiner

Primary Examiner—Ba Huynh
(74) Attorney, Agent, or Firm—David A. Mims, Jr.

(57) ABSTRACT

A range selector component displays and enables the definition of discontiguous sub-ranges from within a range. The component implements a paint mechanism for displaying the range selector component and one or more discontiguous sub-ranges within the range of the component; and implements mouse listener interfaces so as to respond to pointer interaction with the rendered range selector component, for defining the one or more discontiguous sub-ranges. In particular, the selector is responsive to pointer selection within a sub-range to split the sub-range into two sub-ranges.

12 Claims, 2 Drawing Sheets

METHOD AND COMPONENT FOR DISCONTIGUOUS RANGE SELECTION

FIELD OF THE INVENTION

The present invention relates to a method and component for the display and definition of one or more discontiguous sub-ranges within a range.

BACKGROUND OF THE INVENTION

"The Java Foundation Class library (JFC) includes the Java interface javax.swing.ListSelectionModel. This interface defines services in support of the notion of a selected sub-range or sub-set of items or elements from an available range or set of items or elements. It provides for three operational modes, including one mode that allows for multiple discontiguous selected sub-ranges of items, Furthermore, the JFC includes the Java class javax.swing.JList, which can present and modify a ListSelectionModel as a vertical list of items, each supporting selection emphasis. The JList class supports many standard user interactions, using a pointing device such as a mouse, or using the keyboard, that allow the set of selected items to be modified."

However, the JList is primarily intended to be a self contained user interface component in that it presents items for selection, and allows their selection, in a single component, Support is offered for textual items, and a generalised mechanism is provide plugging in item renderers for non-textual items

DISCLOSURE OF THE INVENTION

The present invention provides a range selector component for the display and definition of discontiguous sub-ranges from within a range, said component comprising: means for displaying said range selector component and one or more discontiguous sub-ranges within the range of said component; and means, responsive to pointer interaction with said rendered range selector component, for defining said one or more discontiguous sub-ranges; said defining means being responsive to pointer selection within a sub-range to split said sub-range into two sub-ranges.

The invention treats contiguous selections as a sub-range entity that can be directly manipulated, allowing more rapid interaction suited to certain exploratory tasks. In a preferred embodiment, arbitrary segment sizes, each corresponding to an element or item, are supported by the component.

BRIEF DESCRIPTION OF THE DRAWINGS

An embodiment of the invention will now be described with reference to the accompanying drawings, in which.

DESCRIPTION OF THE PREFERRED EMBODIMENTS

The preferred embodiment will be described in terms of a Java class, RangeSelector, although it will be seen that the invention is not limited to the Java language or the particular combination of methods and method names used in describing the preferred embodiment.

Figure 1:
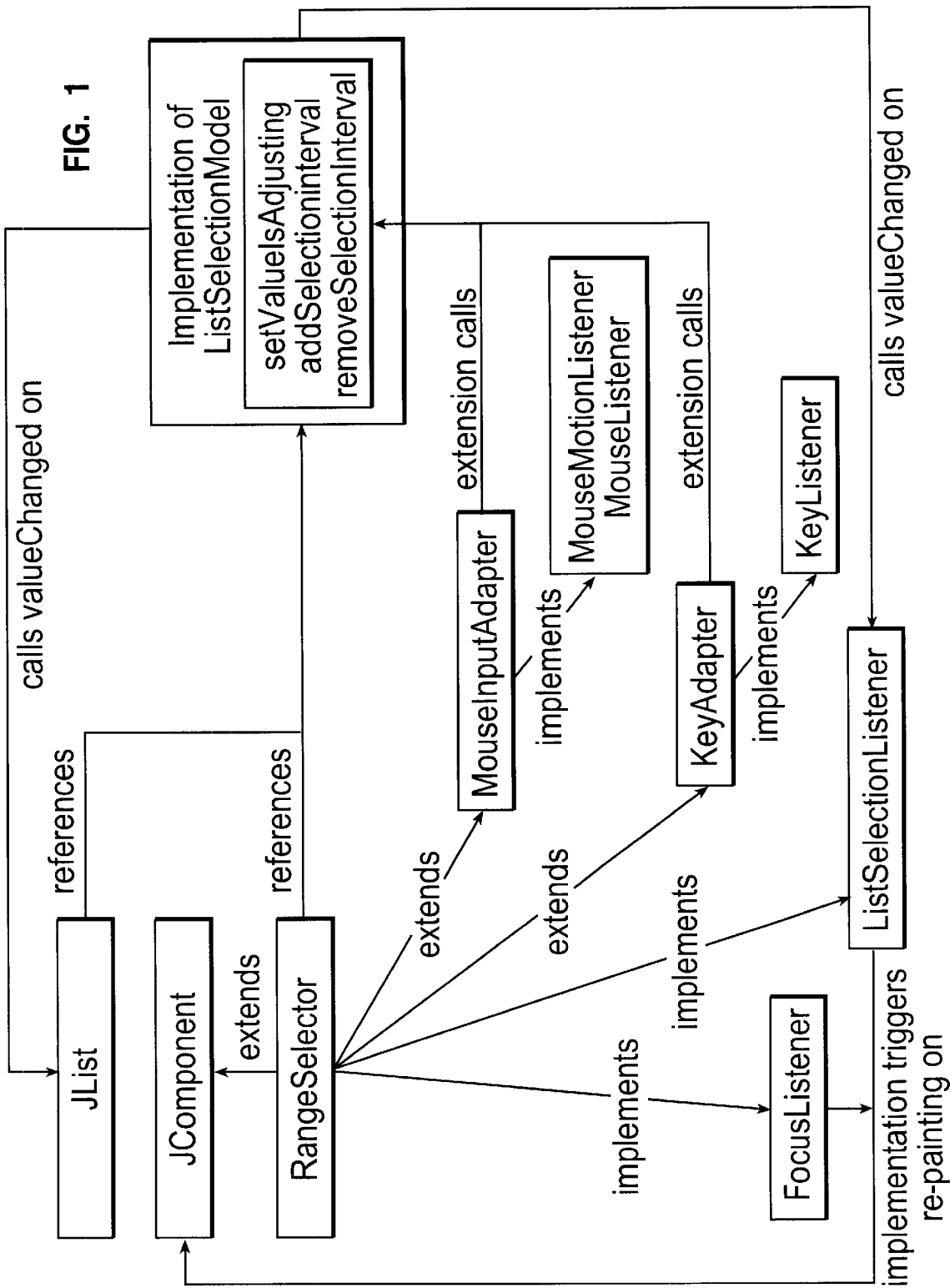
FIG. 1 shows the relationships between the main implementation units of a RangeSelector class according to a preferred embodiment of the invention.

Referring now to FIG. 1, RangeSelector cooperates with implementations of the standard ListSelectionModel, but presents alternative selection presentation and interaction. It is intended to be used either in isolation or in conjunction with other user interface components, where the presentation of selected items requires a more specialised approach. It's use of screen real estate is considerably more economical than that of, for example, Jlist, since it does not undertake to present a view of item content, only a representation of item selection state. This allows the RangeSelector to be positioned adjacent to other user interface components that may be providing a rich interpretation of selected items, freeing those components from the need to provide their own full function item selection model.

Whilst the JList presents selected items, it has no notion of a contiguous sub-range of selected items as an entity to be manipulated. The RangeSelector, on the other hand, treats contiguous selected items as a sub-range, and allows sub-ranges to be resized in either direction, or moved in either direction within the available set of items. Although the underlying operations on a ListSelectionModel are the same as those employed by JList (indeed, a RangeSelector instance and a JList instance may both reflect the state of a single ListSelectionModel instance, and each update in synchronisation with the other), the notion of a sub-range at the user interface is useful in certain circumstances. The RangeSelector allows for rapid range extension and movement, which for highly interactive applications may be important.

The information required by RangeSelector may be provided via its constructor or via 'setter' methods below:

RangeSelector.setSelectioriModel(ListSelectionModel selectionModel); The supplied ListSelectionModel is an implementation of the standard Java javax.swing.ListSelectionModel interface, well known to those skilled in the art.

ListSelectionModel RangeSelector.getSelectionModel( ); The ListSelectionModel currently reflected by the RangeSelector is returned.

These methods are also implemented by, for example, JList, so enabling an instantiation of JList to determine which instantiation of ListSelectionModel is referenced by RangeSelector so that the JList instantiation can reference the same instantiation of ListSelectionModel, or vice versa. Both RangeSelector and JList implement the ListSelectionListener interface so that once they determine the ListSelectionodel, the JList and RangeSelector instantiations register as ListSelectionListeners with this ListSelectionModel, thus linking the items displayed by JList with the RangeSelector.

RangeSelector extends java.swing.JComponent and so it inherits all of the methods of JComponent, well known to those skilled in the art. JComponent provides an area of screen real estate, the means to paint on that area, and the means to receive input device events directed at the area. The information required by RangeSelector for painting is supplied through one of two methods:

RangeSelector.setSegmentSizes(double [ ] segmentsizes); The supplied segment sizes, each corresponding to a selectable item, are normalised to fit within the available space, as defined by the prevailing dimensions of the RangeSelector component.

Re-normalisation occurs whenever the RangeSelector component size is altered.

RangeSelector.setSegmentOffsets(int [ ] segmentoffsets); The supplied segment offsets are expressed in pixels, and applied directly to the relative screen co-ordinates within the component space. This method is an alternative to setSegmentSizes, allowing client programs containing RangeSelectors to perform segment size normalisation and apply that normalisation to the RangeSelector and other components.

RangeSelector provides mouse and keyboard event handling logic to determine which items in a range are to be selected. Thus, like any conventional component, RangeSelector preferably implements the standard interfaces MouseMotionListener, MouseListener, KeyListener and FocusListener. As RangeSelector only needs to implement a subset of the methods from the first three interfaces, standard abstract adapter classes MouseInputAdapter and KeyAdapter are extended by RangeSelector so as to provide ready implementations of these interfaces. No adapter is used for FocusListener as it only requires focusGained and focusLost to be implemented.

For selection modification on the underlying ListSelectionModel, the extensions of the adapter classes call the following methods on the implementation for ListSelectionModel:

To extend a range, the newly selected elements are added to the ListSelectionModel using addSelectionInterval (int index0, int index1).

To shrink a range, the newly de-selected elements are removed from the ListSelectionModel using removeSelectionInterval(int index0, int index1).

To move a range, the addition of elements to one end of the range, and the removal of elements from the other, must be treated as an atomic operation if the range is to be kept at a constant number of elements. To achieve this, setValueIsAdjusting(true) is called before the add/remove calls to suppress change notification, and setValueIsAdjusting(false) is called after the add/remove calls are complete to trigger change notification.

As explained above, RangeSelector implements the ListSelectionListener interface, and so RangeSelector registers with the ListSelectionModel to receive change notifications. Thus, in common with all Model/View/Controller (MVC) designs, RangeSelector does not update its appearance until notified of change by the ListSelectionModel whose implementation calls valuechanged on the RangeSelector implementation of ListSelectionListener. When received, these calls trigger repainting of the RangeSelector so that it reflects the new selection state.

Figure 2:
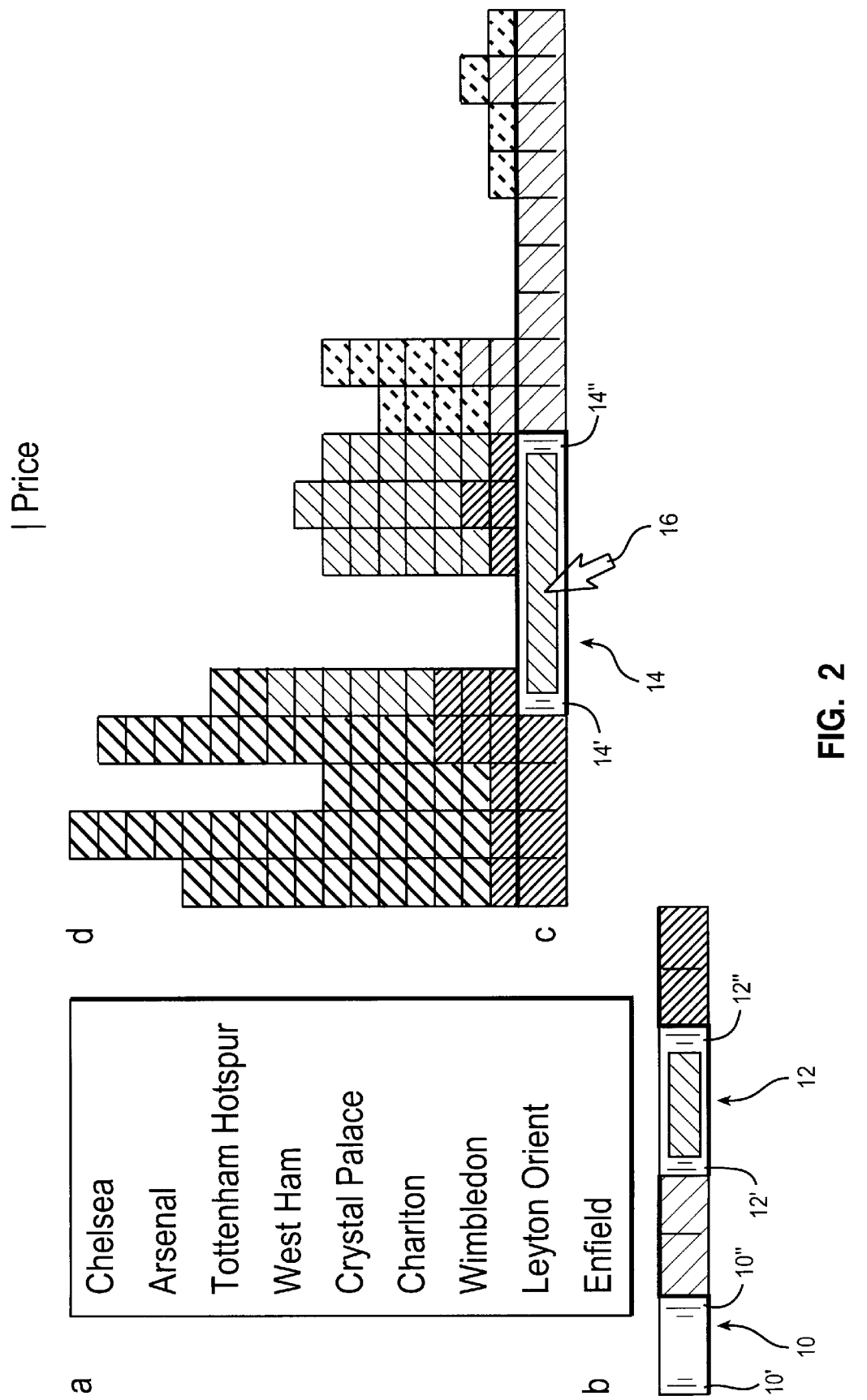
FIG. 2 shows two examples of the RangeSelector class in operation.

To explain the operation of the invention in more detail, two examples of RangeSelector shown in FIG. 2.

On the left, a standard JList (a) is shown above a RangeSelector (b). They are both connected to the same implementation of ListSelectionModel, and so represent the same selection state.

On the right, RangeSelector (c) is used in conjunction with bar chart (d). The bar chart shows the effect of changing the acceptable price range of houses within the RangeSelector (c). Each rectangle represents a house, and those of the lightest shade meet all criteria. Not all houses within the selected price range are lightly shaded because some have failed other criteria (not shown) possibly set by other RangeSelector components in association with those other criteria. The number of criteria that each house has failed is indicated by the shade; the darker the shade, the more criteria that have failed. By moving or sizing the acceptable price range, the cumulative affect of price and other constrained attributes may be rapidly discerned.

In this example the price segments are of equal size, but this need not be the case. RangeSelector allows the relative segment sizes to be defined using the setSegmentOffsets or setSegmentSizes methods, and will draw them accordingly. Because price is a continuous scale, the most common application would be to experiment with a single range. With categorical data as in the case of JList (a), however, discontiguous selections may be common.

Each selected sub-range 10, 12, 14 within a RangeSelector is drawn with a sizing handle 10',10"; 12' 12"; and 14',14" at each end. When a mouse pointer 16 is moved over these handles, the mouse pointer preferably changes to indicate that movement of the handle is possible. Preferably, depression of mouse button one followed by mouse movement adjusts that limit of the sub-range. So, for example, clicking on sizing handle 10" and dragging the mouse towards the right causes RangeSelector to add Tottenham Hotspur to the selected items on the associated ListSelectionModel. JList (a) is listening to this ListSelectionModel and as soon as it detects this change in selected items, it triggers a re-paint, as does the RangeSelector with its instance of JComponent, thus causing both the JList (a) and the RangeSelector (b) to be redisplayed correctly. (It should be noted that JList also extend JComponent and so triggers its re-paint in the same manner as RangeSelector.)

While over the centre of a sub-range 10, 12, 14, the mouse pointer 16 preferably reverts to its normal state, to distinguish between the sub-range extension operation described above and a sub-range movement operation. Preferably, depression of mouse button one followed by mouse movement adjusts both limits of the sub-range, shifting the sub-range left or right, thus altering its position within the total available range.

Clicking mouse button one over a sub-range deselects the range segment under the mouse. If the range segment is an end segment, as in the case of the segments beneath the sizing handles, then the sub-range is shortened.

Thus, simply clicking on sizing handle 12" causes Wimbledon to be deselected.

Clicking on the centre of a sub-range causes the range segment beneath to be deselected and so the sub-range is split. So clicking on the centre of sub-range 12 causes Charlton to be deselected and respective sub-ranges corresponding to Crystal Palace and Wimbledon to be re-painted.

Finally, clicking mouse button one on an unselected segment extends any adjacent sub-range, or introduces a new sub-range for that segment.

The three elements of each sub-range (minimum handle, centre, maximum handle) may all receive keyboard focus as RangeSelector extends KeyAdapter. The direction of keyboard events to the appropriate sub-range within the RangeSelector with focus is handled by RangeSelector logic. Focus emphasis is drawn on the range element deemed to have focus while the RangeSelector has focus. In FIG. 2 the centre of the sub-range 12 in RangeSelector (b) has keyboard focus, and the centre of the sub-range 14 in RangeSelector (c) has keyboard focus, indicated by the focus emphasis. Focus traversal is supported using the Tab key to move focus forward (left to right, top to bottom), or Shift+Tab to move focus backward (right to left, bottom to top). The range element with focus may be moved using the Left/Right/Up/Down arrow keys. The Space bar may be pressed to deselect the entire sub-range within which keyboard focus lies. If a RangeSelector has keyboard focus, but no sub-range selected, focus emphasis is drawn across the whole of the background. In this state the Space bar may be pressed to select the whole RangeSelector. In addition, Ctrl+A may be used to select the whole RangeSelector, and Ctrl+Z to deselect the whole RangeSelector.

The above description relates to the explicit operation of RangeSelector, however, it should be noted that as ListSelectionModel has no notion of a sub-range, only the individual selection state of each element, and that RangeSelector operates only on the selection states provided by the referenced ListSelectionModel, some beneficial behaviours apply to the preferred embodiment. One consequence is that if a user moves or sizes one sub-range such that it is adjacent to another sub-range, the two sub-ranges are instantly merged into a single range. In addition, the current user interaction is terminated at that point. So if the user moves sub-range in FIG. 2, two places to the right, the sub-range 10 merges with sub-range 12, and the move operation is terminated. A new move operation has to be started to move the merged sub-range. By the same token it is possible to shrink a range out of existence. If a user drags one of the sizing handles toward the other until they cross over, the range disappears.

While the preferred embodiment of the invention has been described in terms of a horizontally rendered RangeSelector, it will be seen that the invention is equally applicable to a vertically rendered RangeSelector.

It should also be seen that while the invention has been described in terms of discrete selectable items such as sub-ranges of house prices or football teams, the invention is equally applicable to truly continuous attributes.

Furthermore, it should be seen that while the range selector has been described as being displayed separately from a range, either continuous or comprising discrete elements such as the Jlist (a), within which sub-ranges are defined, it is within the scope of the present invention for the range selector to be superimposed on this range, particularly in applications where screen real estate is at a particular premium.

It should be seen that the pointer selection paradigm described, ie clicking mouse button one and clicking and dragging mouse button one is for exemplary purposes only, and that the invention may be implemented using a variety of pointer selection paradigms.

What is claimed is:

1. A range selector component for the display and definition of discontiguous sub-ranges from within a range, said component comprising:

means for displaying said range selector component and one or more discontiguous sub-ranges within the range of said component; and means, responsive to pointer interaction with said rendered range selector component, for defining said one or more discontiguous sub-ranges;

said defining means being responsive to pointer selection within a sub-range to split said sub-range into two sub-ranges.

2. A range selector component as claimed in claim 1 wherein said defining means, responsive to pointer selection within the centre of a sub-range, is adapted to deselect a portion of said sub-range corresponding to said pointer selection.

3. A range selector component as claimed in claim 1 wherein
   said defining means is responsive to pointer selection within an unselected portion of said range to select at least some of said portion and to define a new sub-range accordingly.

4. A range selector component as claimed in claim 1 wherein the or each discontiguous sub-range includes a pair of sizing handles corresponding to respective minimum and maximum values of said sub-range.

5. A range selector component as claimed in claim 4 wherein
   said defining means is responsive to pointer selection of a sizing handle for a sub-range and subsequent pointer movement to adjust the respective value of said sub-range accordingly; and
   said defining means is responsive to pointer selection of a centre of a sub-range and subsequent pointer movement to simultaneously adjust both minimum and maximum values of said sub-range accordingly.

6. A range selector component as claimed in claim 4 wherein
   said defining means is responsive to pointer selection of a sizing handle of a sub-range to deselect a portion of said sub-range corresponding to said sizing handle and to shorten said sub-range accordingly; and
   said defining means being responsive to pointer selection of an unselected portion of said range adjacent a sizing handle of a sub-range to select at least some of said portion of said range and to lengthen said sub-range accordingly.

7. A range selector component according to claim 1 in which said range comprises a set of elements and wherein said elements are of variable sizes.

8. A range selector component according to claim 1 further comprising:
   means cooperable with a list selection model component for storing a plurality of selection intervals and responsive to said pointer interaction for adding, removing and adjusting said selection intervals; and
   means responsive to changes in said selection intervals for causing said displaying means to re-display said range selector component.

9. A range selector component according to claim 8 further comprising:
   means responsive to said range selector gaining focus for causing said displaying means to re-display said range selector component.

10. A range selector component according to claim 1 further comprising:

means, responsive to keyboard interaction with said rendered range selector component, for defining and adjusting said one or more discontiguous sub-ranges.

11. A method of displaying and defining discontiguous sub-ranges from within a range, said method comprising the steps of:

displaying said range selector component and one or more discontiguous sub-ranges within the range of said component; and responsive to pointer interaction with said rendered range selector component, defining said one or more discontiguous sub-ranges;

wherein said defining step comprises responding to pointer selection within a sub-range to split said sub-range into two sub-ranges.

12. An article of manufacture comprising a computer usable medium having computer readable program code means embodied therein for displaying and defining discontiguous sub-ranges from within a range, the computer readable program code means in said article of manufacture comprising:

computer readable program code means for causing a computer to display said range selector component and one or more discontiguous sub-ranges within the range of said component;

computer readable program code means for causing a computer to respond to pointer interaction with said rendered range selector component to define said one or more discontiguous sub-ranges and to respond to pointer selection within a sub-range to split said sub-range into two sub-ranges.

* * * * *